W. F. NICKELS.
Refrigerator.
No. 100,182.  Patented Feb. 22, 1870.
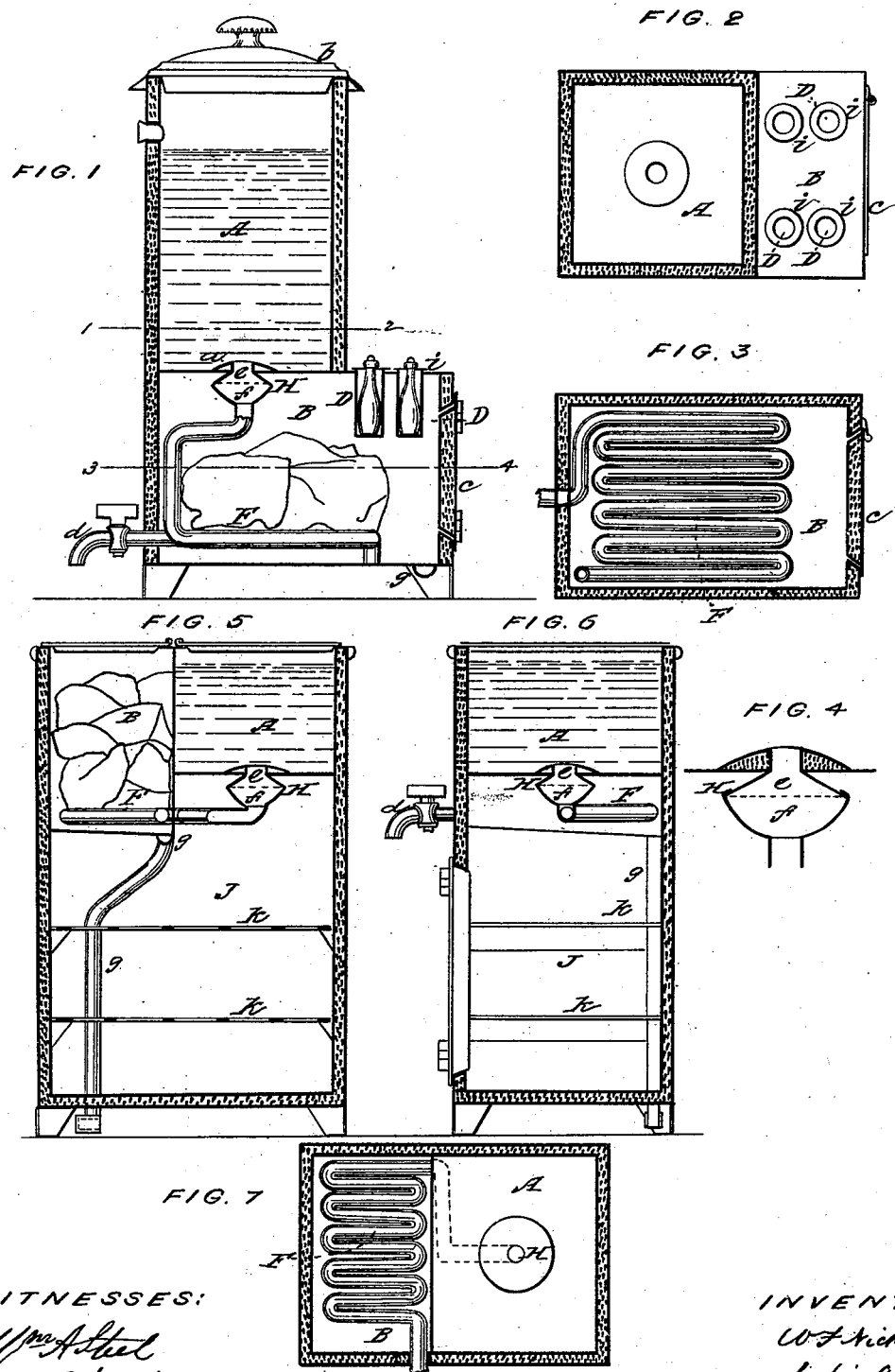
WITNESSES:
INVENTOR:

United States Patent Office.

WILLIAM FRANK NICKELS, OF PHILADELPHIA, PENNSYLVANIA.

Letters Patent No. 100,182, dated February 22, 1870; antedated September 7, 1869.

IMPROVED WATER-FILTER, LIQUOR-COOLER, AND REFRIGERATOR.

The Schedule referred to in these Letters Patent and making part of the same

*To all whom it may concern:*

Be it known that I, WILLIAM FRANK NICKELS, of Philadelphia, Pennsylvania, have invented a Combined Water-Filter, Water and Liquor-Cooler, and Refrigerator; and I do hereby declare the following to be a full, clear, and exact description of the same.

My invention consists of a cooling apparatus, in which a tank, a filter, and a coiled pipe are so combined with an ice-box that fluids contained in the tank shall, as they pass from the same, be first filtered and then cooled in the coiled pipe, as fast as required for use.

My invention also consists in the combination with the above of certain bottle-holders, and of a chamber for meats, provisions, &c., all of which will be fully described hereafter.

In order to enable others to make and use my invention, I will now proceed to describe the mode of constructing and using the same, reference being had to the accompanying drawing, which forms a part of this specification, and in which—

Figure 1 is a vertical sectional view of the apparatus.

Figure 2, a sectional plan view of the same on the line 1–2, fig. 1.

Figure 3, a sectional plan on the line 3–4, fig. 1;

Figure 4, a detached sectional view drawn to an enlarged scale;

Figures 5 and 6, vertical sections of a modified form of apparatus; and

Figure 7, a sectional plan view of the same.

Similar letters refer to similar parts throughout the several views.

The apparatus, as shown in the first four figures of the drawing, is intended principally for filtering water and for cooling water and liquors, and consists of two main chambers A and B, arranged one above the other, and separated by a partition, *a*, as best observed in fig. 1.

Both of these chambers are surrounded by the usual double walls and non-conducting packing, and the upper chamber A, which forms the water reservoir, has at the top a lid, *b*, similar to those of ordinary water-coolers.

The lower chamber or ice-box B is furnished with a door, *c*, and is somewhat wider than the water-tank A, in order that a space may be provided for the bottle-holders D, referred to hereafter, and close to the bottom of this ice-box is arranged a horizontal coiled pipe, F, one end of which communicates (within the box) with a filter, H, while its opposite end projects through the side of the box, and terminates in a spigot, *d*.

The filter H is of the form best observed in fig. 4; and communicates with the bottom of the tank A, it being provided beneath the filtering partition *e* with a receiver, *f*, in which a supply of filtered water, over and above that contained in the coiled pipe F, can be maintained ready for use.

The bottle-holders D, before referred to, consist of a number of cup-shaped vessels of thin metal, each adapted to receive a bottle, these holders being open at the top, and provided with flanges *i*, so that they can be pasesd through openings in the top of the ice-box, and suspended within the same, as shown in fig. 1.

The ice is introduced into the ice-box through the door *c*, and is piled upon the coil F, it speedily chilling the water contained in the coil, as well as that in the receiver *f*, and so far reducing the temperature within the chamber B that bottles of liquor placed in the holders D, and thus brought in contact with their chilled surfaces, will be maintained in a cool state.

The drippings from the ice, instead of being allowed to accumulate in the ice-box, pass through perforations in the bottom of the same to a pipe, *g*, being thence removed from time to time, after withdrawing a plug from the end of said pipe.

The cooler as above constructed is intended especially for hotel and bar-room use, it being placed upon the bar or counter in such a position that the spigot *d*, from which the supply of water is to be drawn, shall be easy of access from the front of the bar, while the bottles of liquor contained in the holders D shall be within convenient reach of the bar-tender.

It has been usual heretofore to cool bottles of liquor by placing them directly upon the ice, but this plan, besides being inconvenient, involves the necessity of frequently opening the ice-box, and of thus admitting warm air to the interior of the same.

By constructing the cooler according to the above plan, however, the ice-box remains continually closed, so that a comparatively small quantity of ice will perform all the duties required.

If desired, the tank A may be made to serve as a reservoir for ale, beer, or other malt liquor, instead of water, the liquor to be pumped or otherwise introduced into the tank through an opening, *g*, in the side of the same, and passed through the coil F, and cooled in the same manner as the water. The filter can in this case be dispensed with, although this is not essential.

The apparatus, as constructed in the last three figures of the drawing, is intended more especially for domestic use, or where a chamber is required for the preservation of meats, provisions, &c. In this case, both the water-tank A and ice-box B are arranged at the top of the apparatus, and the provision-chamber J, with its usual gratings *k k* at the bottom.

The arrangement of the water-filter H, its receiver *f*, and the coiled pipe F, with the spigot, is the same as before described.

The drip-water from the ice-box is also conveyed into a pipe, $g$, but instead of being withdrawn directly from the latter, is first passed through a supplementary pipe, $g'$, to the bottom of the apparatus. (See fig. 5.)

It should be understood that the filter, coiled pipe, and other portions of the apparatus are made detachable from each other, so that they can be readily taken apart for necessary cleansing or repairs.

I claim as my invention, and desire to secure by Letters Patent—

1. The combination of a water-reservoir, A, pipe F, filter H, and ice-chamber, into which the said pipe projects, and where it is coiled to form a support for the ice, all substantially as described.

2. The receptacles D, combined with a filter or cooler, substantially as and for the purpose specified.

In testimony whereof, I have signed my name to this specification in the presence of two subscribing witnesses.

W. FRANK NICKELS.

Witnesses:
JOHN WHITE,
HARRY SMITH.